United States Patent
Kato et al.

(10) Patent No.: US 6,487,250 B1
(45) Date of Patent: Nov. 26, 2002

(54) SIGNAL OUTPUT SYSTEM

(75) Inventors: Tetsuro Kato, Tokyo (JP); Seiichi Saito, Tokyo (JP); Keitaro Yamagishi, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 09/401,325

(22) Filed: Sep. 23, 1999

(30) Foreign Application Priority Data

Apr. 8, 1999 (JP) .......................................... 11-101704

(51) Int. Cl.[7] .............................. H04B 3/00; H04L 25/00
(52) U.S. Cl. ........................... 375/257; 333/32; 330/144
(58) Field of Search .............................. 375/256, 257, 375/259, 224, 219; 379/398; 333/32, 17.3; 330/144, 284

(56) References Cited

U.S. PATENT DOCUMENTS 5,880,635 A * 3/1999 Satoh .......................... 330/144

FOREIGN PATENT DOCUMENTS

| JP | 07202671 A | * | 8/1995 |
| JP | 10261948 | | 3/1997 |
| JP | 10105304 | | 8/1997 |
| JP | 2000276251 | * | 10/2000 |

OTHER PUBLICATIONS

AVC Logic Family Technology and Applications (Texas Instrument, Aug. 1998).
Dynamic Output Control (DOC TM) Circuitry Technology and Application (Texas Instrument, Aug. 1998).

* cited by examiner

Primary Examiner—Jean Corrielus
(74) Attorney, Agent, or Firm—Birch, Stewart, Kolasch & Birch, LLP (57) ABSTRACT

When a change of an output signal is detected by an output-signal-state-change detector, a continuous-change performing part controls an output impedance changing part, which is provided between an output buffer and a signal line, so as to continuously change an output impedance from low impedance to high impedance, at the changing timing of the output signal.

14 Claims, 12 Drawing Sheets

SIGNAL OUTPUT SYSTEM

BACKGROUND OF THE INVENTION

1. Field of the Invention

The present invention relates to a signal output circuit for outputting signals to the transmission line, especially to a signal output system by which, for instance, a waveform distortion on the signal line caused by a high-speed signaling can be suppressed.

2. Description of the Related Arts

Figure 17:
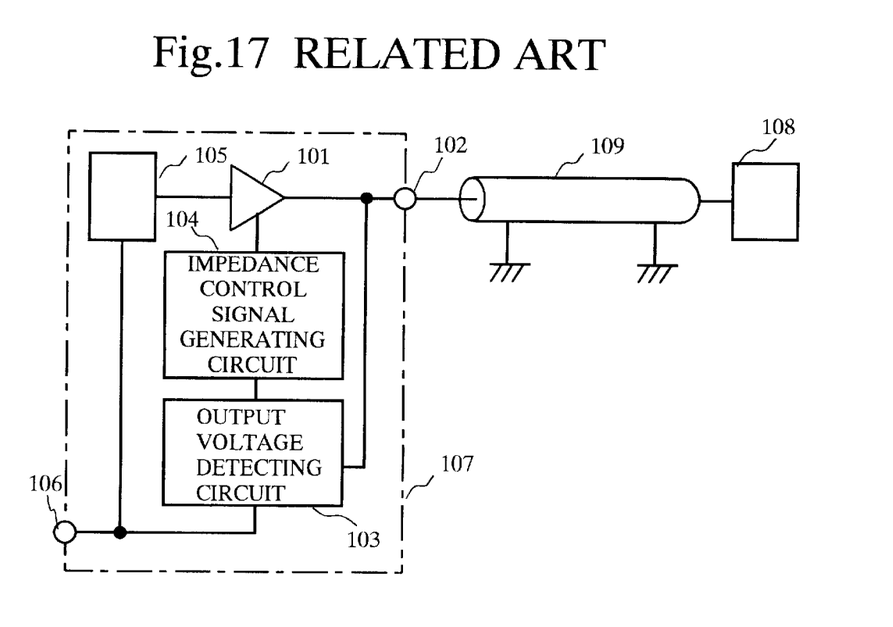
FIG. 17 shows the conventional semiconductor integrated circuit with output impedance self correction circuit.

FIG. 17 shows the semiconductor integrated circuit with output impedance self correction circuit disclosed in Unexamined Japanese Patent Publication No. 10-261948.

In the semiconductor integrated circuit with output impedance self correction circuit of FIG. 17, an internal circuit 105 of a semiconductor integrated circuit 107 is connected to an output circuit 101, and an output terminal 102 is connected to a receiving circuit 108 via a transmission line 109 having an impedance, such as a cable or a print wiring board. According to this conventional art, the input to the receiving circuit 108 needs no termination process, and the input impedance is supposed to be infinite.

The initial state of the output circuit 101, in this conventional art, is set to have the maximum output impedance, meaning the minimum drive ability, at the time just after the power-on of the semiconductor integrated circuit 107. Then, the output impedance is going to be sequentially adjusted.

The internal circuit 105 transmits a test pattern signal to the output circuit 101 in order that the output terminal 102 may repeatedly output a signal of low level and a signal of high level, meaning Low level→High level→Low level→High level.

When the output signal begins the transition from Low level to High level, an initial amplitude voltage output from the output circuit 101 is detected at a specific sampling timing by using an output voltage detecting circuit 103. Then, until the detected initial amplitude voltage is found to be around the half of the maximum output amplitude value, meaning until the output impedance is found to be equal to the impedance of the transmission line 109, the sampling test is repeated by way of changing the output impedance of the output circuit 101, at an impedance control signal generating circuit 101.

The value of the output impedance at the time of becoming equal to that of the transmission line 109 is stored in the impedance control signal generating circuit 104. Then, when a signal is output from the output circuit 101, the output impedance of the output circuit 101 is controlled to be the above value.

Figure 18:
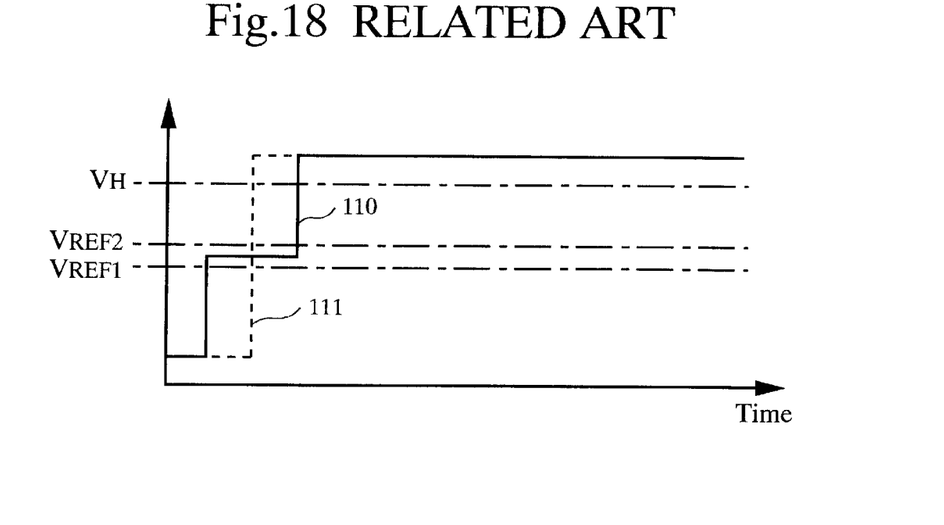
FIG. 18 shows signal waveforms according to the conventional art.

FIG. 18 shows signal waveforms according to the above conventional art. An output-terminal-waveform 110 indicates a signal waveform at the output terminal 102 of FIG. 17. A receiving-circuit-input-waveform 111 indicates a signal waveform at the input terminal (not shown) of the receiving circuit 108.

Though an output signal from the output terminal 101 is reflected at the receiving circuit 108, the output signal is not re-reflected at the output terminal 102 because the output impedance of the: output circuit 101 is matched with the characteristic impedance of the transmission line 109. Consequently, useless ringing is not generated.

The followings are problems of the conventional signal output system, resulted from the above-stated configuration.

Figure 19:
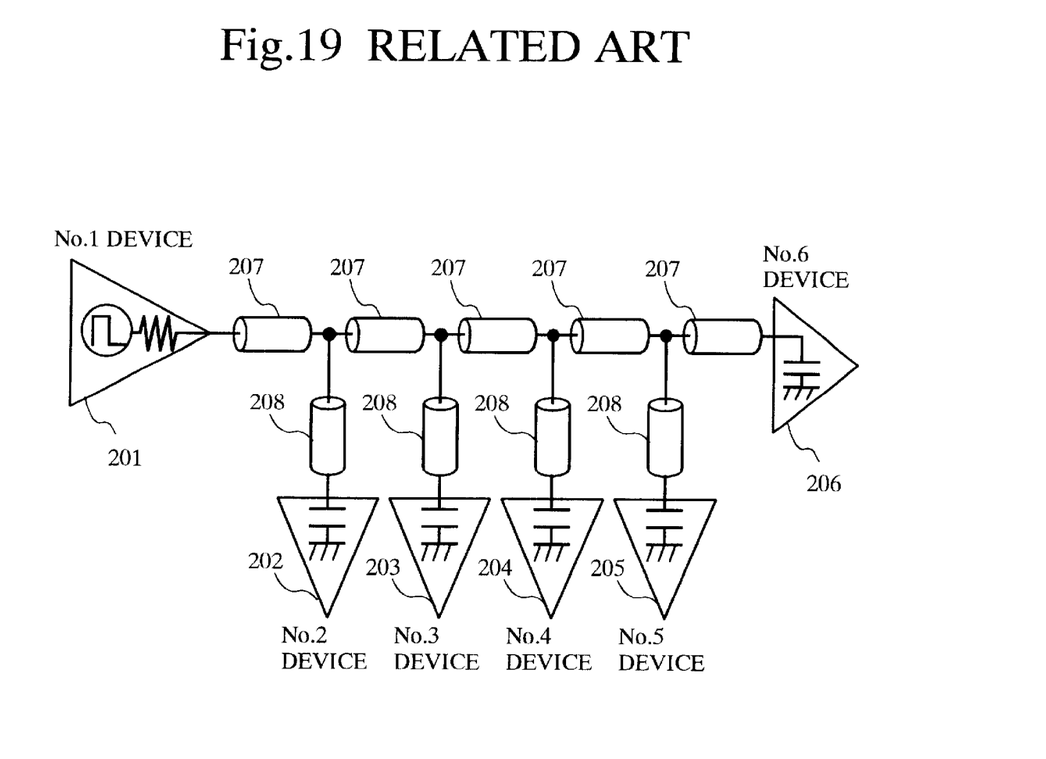
FIG. 19 shows a conventional general bus line.

FIG. 19 shows a general bus line. Each of devices No. 2 through No. 5, that is 202 through 205, is connected to a bus line 207 via a branch line 208. Each of the bus lines 207 and the branch lines 208 has the characteristic impedance of 50Ω and the length of 5 cm.

Figure 20:
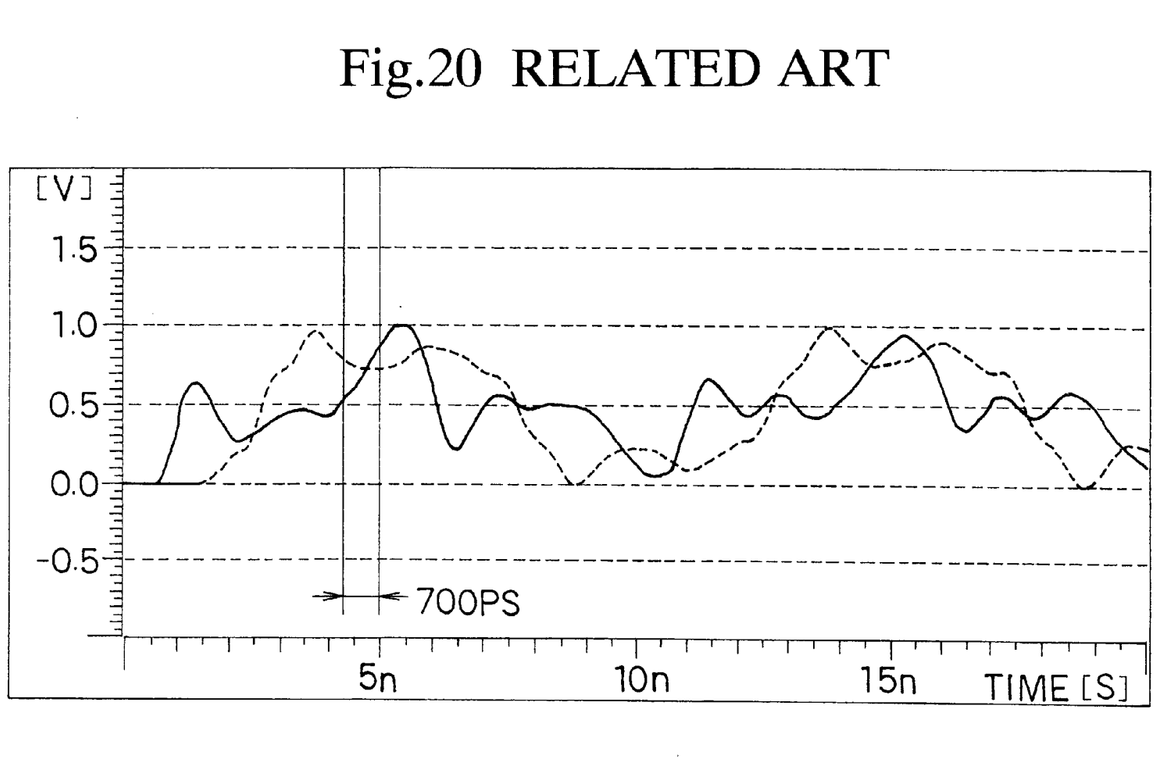
FIG. 20 shows a simulation result of the conventional circuit by simulating with a circuit simulator.

In FIG. 19, when the above buffer is applied to each of the devices, the output impedance is automatically adjusted to be around 50Ω. FIG. 20 shows a simulation result of input waveforms of the No. 2 device 202 and the No. 6 device 206, simulated by using a circuit simulator (SPICE), in the case of the No. 1 device 201 outputting signals which are periodically varied in the toggling state in 200 MHz (5 nsec) cycle. In FIG. 20, the waveform in a solid line denotes the input waveform to the No. 2 device 202 and the waveform in a broken line denotes the input waveform to the No. 6 device 206. A signal at the device, such as No. 2 device 202, closer connected to the output driver (in this case, No. 1 device 201) rises later than other devices far connected to the output terminal, because of the reflection effect. In FIG. 20 case, only about 700 psec is kept as a time for performing the setup.

Consequently, the above defect based on the conventional art principle as shown in FIG. 17 makes the high-speed transmission difficult and enormously restricts the degree of freedom of circuit design.

SUMMARY OF THE INVENTION

In view of the foregoing, it is one of objects of the present invention to provide a signal output system in which a wave distortion generated in the high-speed signal transmission is suppressed and the bus operation speed is enhanced, by way of dynamically controlling an output impedance at the beginning of a signal transmission in order to change the output impedance to high from low.

It is another object of the present invention to provide a signal output system in which an output current is suppressed by changing the output impedance from low to high at the beginning of a signal transmission.

It is another object of the present invention to provide a signal output system in which the degree of freedom of circuit design is not restricted because, as stated above, a wave distortion generated in the high-speed signal transmission can be suppressed.

According to one aspect of the present invention, a digital signal output circuit for outputting an output signal to a signal line via an output buffer comprises an output impedance changing part, connected between the output buffer and the signal line, for changing an output impedance, an output-signal-state-change detector for detecting a change of the output signal, and a continuous-change performing part for controlling the output impedance changing part, at a changing timing of the output signal, so as to continuously change the output impedance, when the output-signal-state-change detector detects the change of the output signal.

According to another aspect of the present invention, in the digital signal output circuit, the continuous-change performing part controls the output impedance changing part, at the changing timing of the output signal, so as to continuously change the output impedance from low to high, when the output-signal-state-change detector detects the change of the output signal.

The above and other objects, features, and advantages of the invention will be more apparent from the following description when taken in connection with the accompanying drawings.

DESCRIPTION OF THE PREFERRED EMBODIMENTS

Embodiment 1

Figure 1:
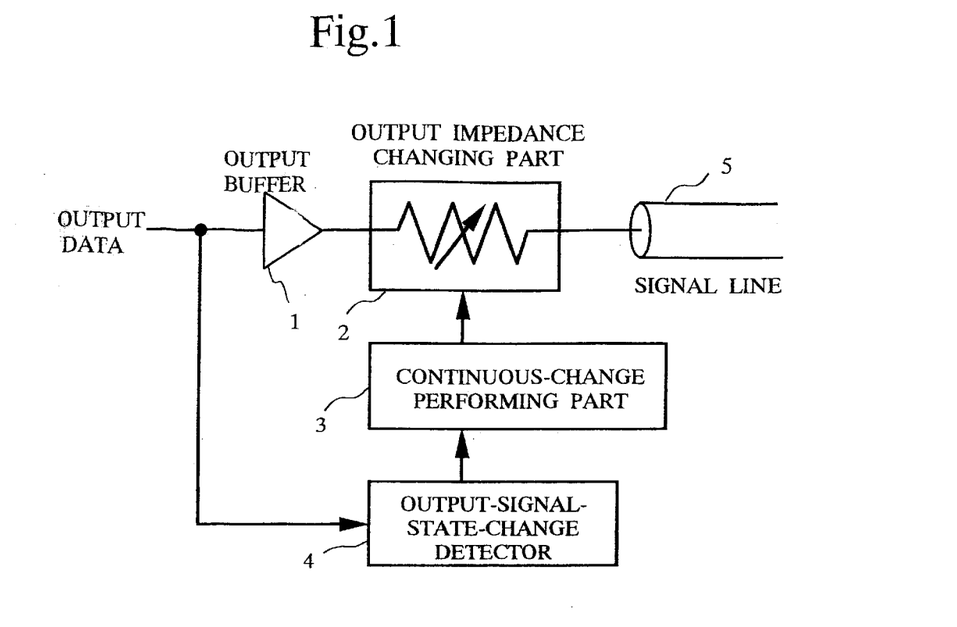
FIG. 1 shows a circuit configuration according to Embodiment 1.

FIG. 1 shows a circuit configuration according to Embodiment 1. In FIG. 1, the followings are shown: an output buffer 1 for outputting a signal, an output impedance changing part 2 for variably controlling an impedance, a signal line 5, a continuous-change performing part 3 for controlling the output impedance changing part 2, and an output-signal-state-change detector 4 for monitoring inputs to the output buffer 1 and controlling the continuous-change performing part 3.

Figure 2:
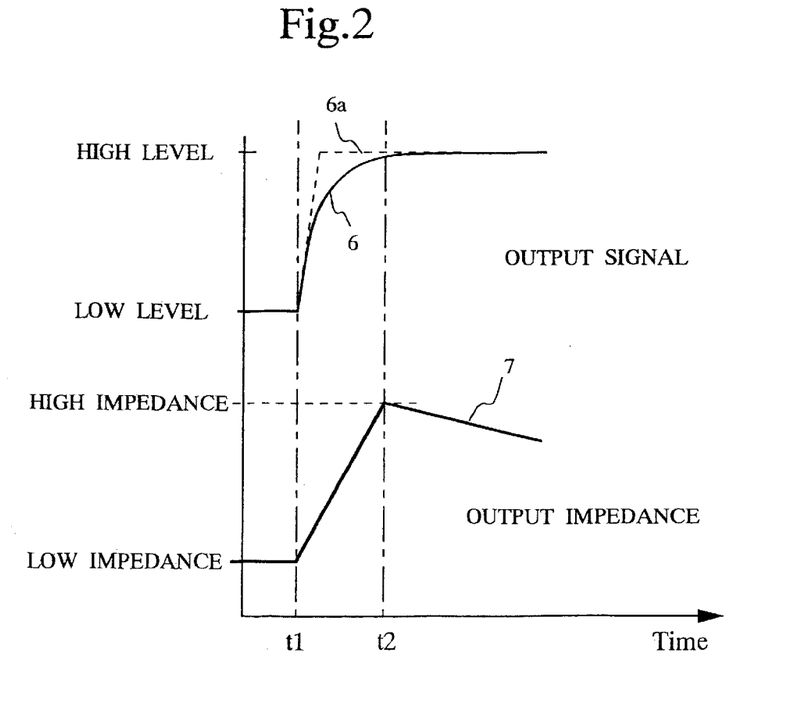
FIG. 2 illustrates the relation between an output impedance and an output signal waveform according to Embodiment 1.

FIG. 2 illustrates the relation between an output impedance and an output signal waveform according to Embodiment 1. An output signal 6 input to the signal line 5, and an output impedance 7 indicating a controlled impedance value of the output impedance changing part 2 are shown in FIG. 2.

The output-signal-state-change detector 4 monitors inputs to the output buffer 1. Then, on detecting a signal value change between the cycle to be output from now (called a next cycle, hereinafter) and the cycle having been already output (called a previous cycle, hereinafter), the output-signal-state-change detector 4 informs the continuous-change performing part 3 that the output impedance should be changed. After receiving the information from the output-signal-state-change detector 4, the continuous-change performing part 3 generates control signals for continuously changing the impedance value of the output impedance changing part 2 and controls the output impedance changing part 2.

Because the impedance value of the output impedance changing part 2 is set low at the time of the beginning of the output signal transition (time t1) by the continuous control signals, output signals can quickly rise since the output buffer 1 is able to supply enough current to the signal line 5. Later, the current value to the signal line 5 from the output buffer 1 is gradually decreased by controlling the impedance value of the output impedance changing part 2 from low to high. The output waveform of the output signal 6 under this state is shown in FIG. 2.

A waveform 6a in the dotted line of FIG. 2 shows an output signal waveform at the time of fixed output impedance. For instance, the waveform 6a shows a signal waveform in the case of there being no output impedance changing part 2 and the output buffer 1 being directly connected to the signal line 5. The waveform 6a, whose edge acutely curves, includes rather high frequency components. Therefore, if there is an impedance discontinuous point, such as a device connected to the signal line 5 or a signal line diverging point, a large signal reflection is generated and the waveform is distorted, which can be a prevention factor of regular signal transmission.

According to the present embodiment, the output signal in FIG. 2 is reformed to be 6 from 6a by controlling the output impedance. Consequently, the signal reflection can be suppressed because the high frequency components in the signal are largely reduced.

Embodiment 2

In the present embodiment, the case of outputting signals only in one direction, such as a clock signal, will be described.

Figure 3:
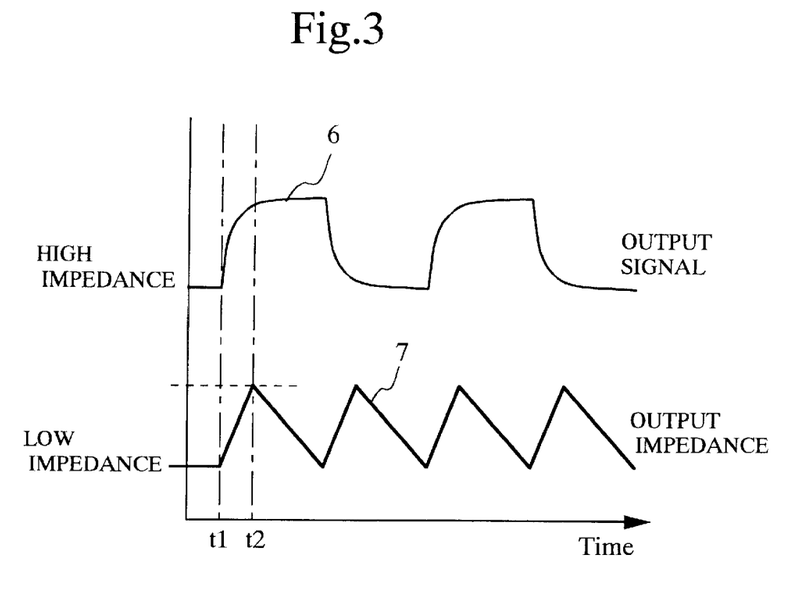
FIG. 3 illustrates the relation between an output impedance and an output signal waveform according to Embodiment 2.

FIG. 3 illustrates the relation between an output impedance and an output signal waveform according to Embodiment 2. In FIG. 3 as well as FIG. 2, the output signal 6 is output from the output buffer 1 and the output impedance 7 indicates a controlled impedance value of the output impedance changing part 2.

As shown in FIG. 3, the impedance value of the output impedance changing part 2 is controlled to make a continuous change to be low at the time of the signal transition beginning (the time t1) and to be high at the time of the signal transition end (the time t2).

Embodiment 3

Figure 4:
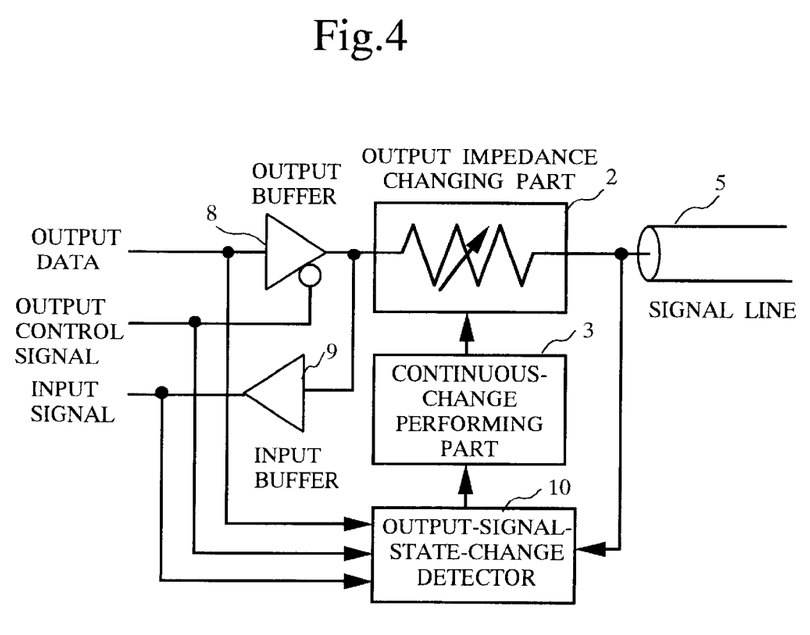
FIG. 4 shows a circuit configuration according to Embodiment 3.

In the present embodiment, the circuit configuration applied to bi-directional buffers will be described with reference to FIG. 4. In FIG. 4, the followings are shown: an output buffer 8 having an output enable/disable control function, an input buffer 9, and an output-signal-state-change detector 10 for monitoring output data and an output control signal(output enable/disable control signal) input to the output buffer 8, and an input signal output from the input buffer 9, and controlling the continuous-change performing part 3. The output impedance changing part 2, continuous-change performing part 3 and the signal line 5 are similar to those in FIG. 1.

Figure 5:
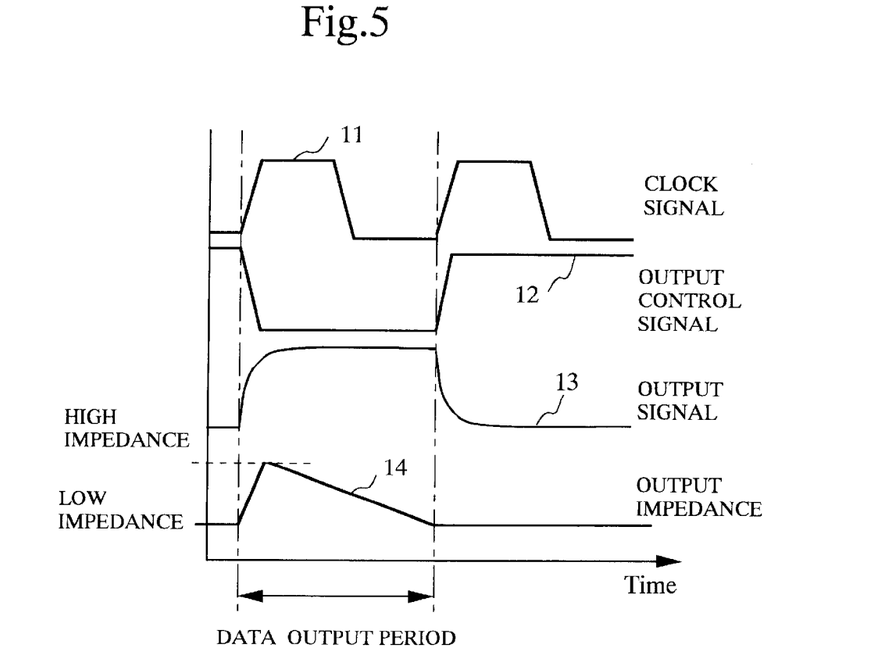
FIG. 5 illustrates the relation between an output impedance and an output signal waveform according to Embodiment 3.

FIG. 5 illustrates the relation between an output impedance and an output signal waveform according to Embodiment 3. A clock signal 11 used for synchronization, an output control signal 12 for controlling the output enable/disable of the output buffer 8, an output signal 13 output from the output buffer 8, and a controlled output impedance 14 of the output impedance changing part 2 are shown in FIG. 5.

Differing from the above embodiments, the bi-directional buffers are applied in the present embodiment. Then, the number of signals which the output-signal-state-change detector 10 monitors is larger than that in the above embodiments. Namely, as the bus state of the previous cycle, the output-signal-state-change detector 10 monitors an input signal output from the input buffer 9, and output data and an output control signal input to the output buffer 8.

The output-signal-state-change detector 10 controls the output impedance changing part 2 only when all the following conditions are provided: the output-signal-state-change detector 10 detects, based on the output control signal, that the output buffer 8 is going to output a signal in the next cycle (that is, the case of the output enable/disable control signal being significant, meaning "Low" in FIG. 5), and when a signal value of the next cycle is detected by using the output data to be input to the output buffer 8 (not shown in FIG. 5), the detected signal value of the next cycle differs from a signal value of the input signal (the bus signal value at the present cycle) detected from the input buffer 9.

For instance, if the bus signal level of the present cycle is "High" and the signal level to be output from the output buffer 8 in the next cycle is also "High", as there is no change between "High" and "High" of the signal levels in the present cycle and in the next cycle, it is not necessary to control the output impedance. If each element is driven under this condition, dissipating power is consumed. Therefore, controlling the output impedance under this condition is suppressed in order to prevent useless power consumption.

Embodiment 4

Figure 6:
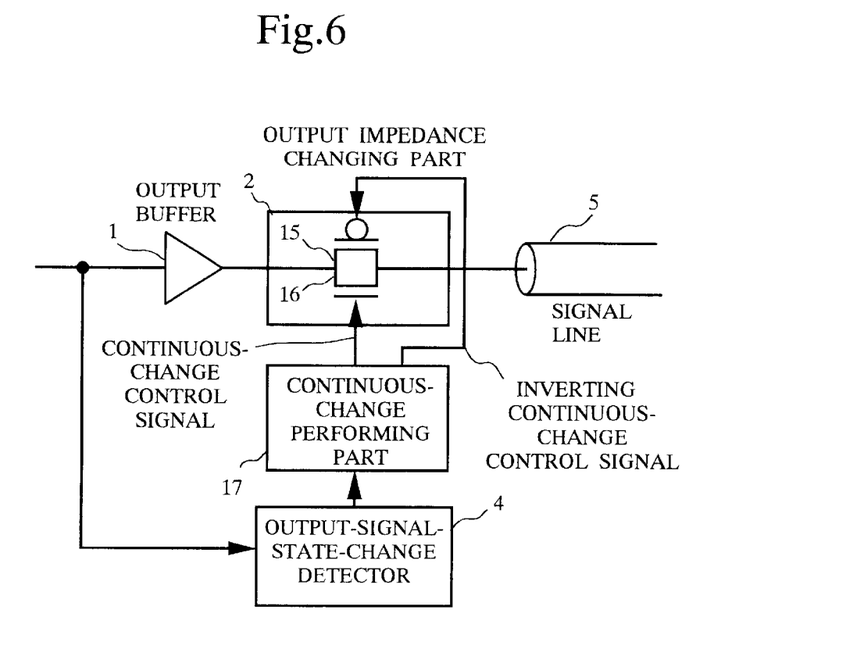
FIG. 6 shows a circuit configuration including the configuration of the output impedance changing part according to Embodiment 4.

The output impedance changing part used in Embodiments 1 through 3 will now be described in the present embodiment. FIG. 6 shows a circuit configuration including the configuration of the output impedance changing part according to Embodiment 4. A PMOS (P type metal oxide semiconductor) transistor 15, an NMOS (N type metal oxide semiconductor) transistor 16 and a continuous-change performing part 17 are shown in FIG. 6.

The output impedance changing part 2 is composed as shown in FIG. 6. The continuous-change performing part 17 controls gate voltages of the PMOS transistor 15 and the NMOS transistor 16 in order to control impedance values between the source and drain of the PMOS transistor 15 and the NMOS transistor 16. Signals for respectively controlling both the gates are opposite-phase signals.

Embodiment 5

Figure 7:
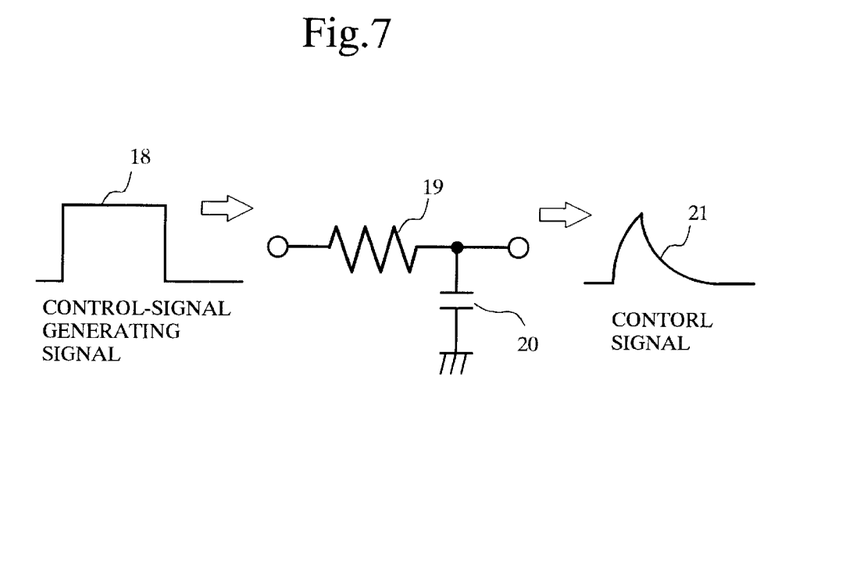
FIG. 7 illustrates a configuration of a continuous-change performing part, a control-signal generating signal, and a control signal, according to Embodiment 5.

The continuous-change performing parts 3 and 17 used in Embodiments 1 through 4 will now be described in the present embodiment. FIG. 7 illustrates the configuration of the continuous-change performing part, a control-signal generating signal, and a control signal, according to Embodiment 5. A control-signal generating signal 18 to be input to the continuous-change performing part 3 or 17 for generating a control signal, a resistance 19, a capacitor 20, and a control signal 21 generated by the continuous-change performing part are shown in FIG. 7.

As shown in FIG. 7, the continuous-change performing part 3 or 17 is composed to form an integrating circuit by using the resistance 19 and the capacitor 20. Then, it is operated in order to generate the control signal 21 of FIG. 7 from the control-signal generating signal 18.

Embodiment 6

Figure 8:
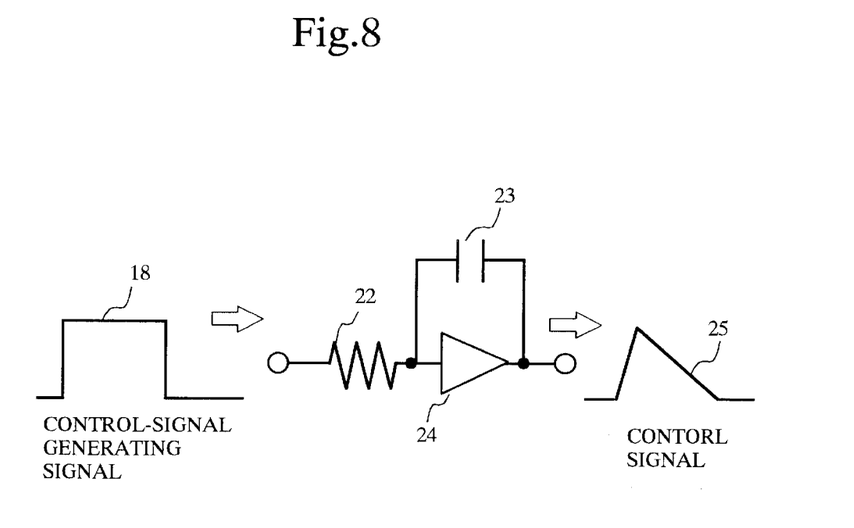
FIG. 8 illustrates a configuration of the continuous-change performing part, a control-signal generating signal, and a control signal, according to Embodiment 6.

The continuous-change performing part different from that explained in Embodiment 5 will now be described. FIG. 8 illustrates the configuration of the continuous-change performing part, the control-signal generating signal, and the control signal, according to Embodiment 6. A resistance 22, a capacitor 23, and an amplifier 24 are shown in FIG. 8. The control-signal generating signal 18 in FIG. 8 is the same as that in FIG. 7 and a control signal 25 is similar to the control signal 21 of FIG. 7.

As shown in FIG. 8, the continuous-change performing part 3 or 17 is composed to form an integrating circuit by using the resistance 22, the capacitor 23 and the amplifier 24. Then, it is operated in order to generate the control signal 25 of FIG. 8 from the control-signal generating signal 18.

Embodiment 7

Figure 9:
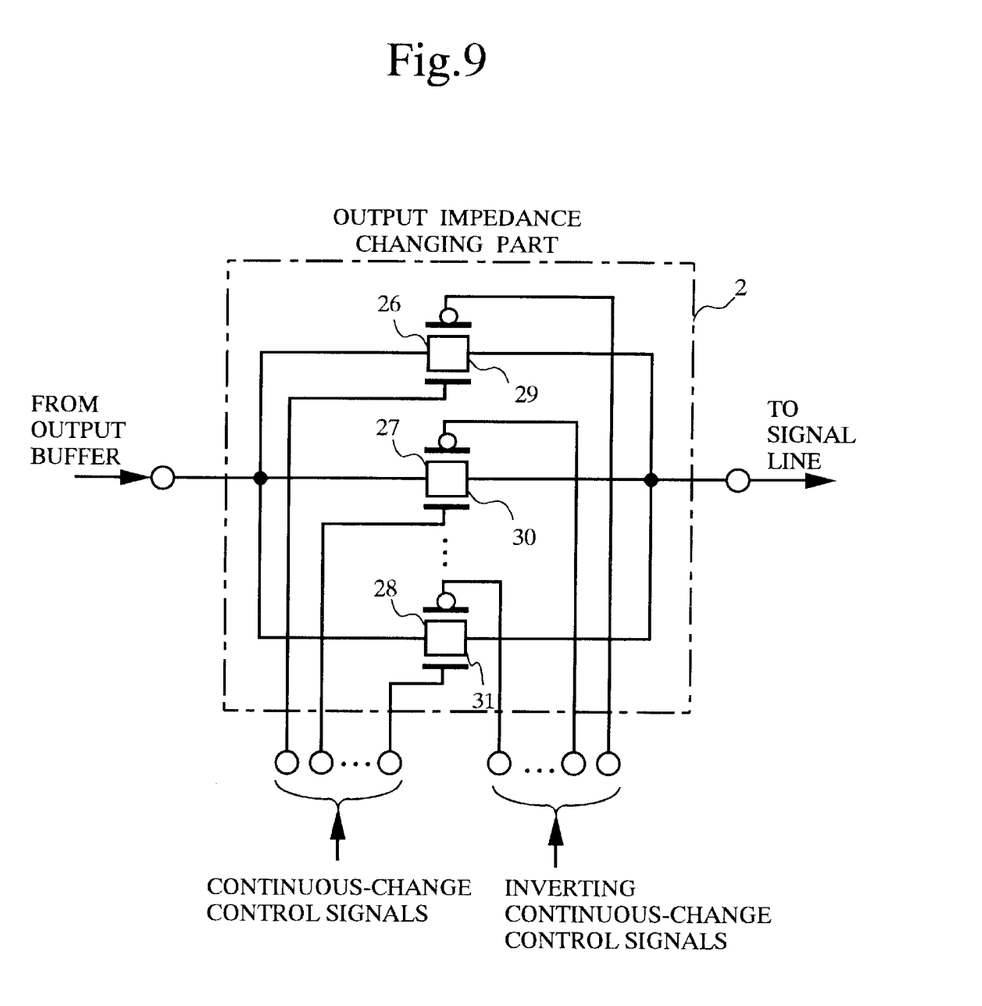
FIG. 9 shows a circuit configuration including a configuration of the output impedance changing part according to Embodiment 7.

An output impedance changing part made by improving the output impedance changing part stated in Embodiment 4 is described in the present embodiment. FIG. 9 shows a circuit configuration including the configuration of the output impedance changing part according to Embodiment 7. PMOS transistors 26, 27 and 28, and NMOS transistors 29, 30 and 31 are shown in FIG. 9.

In the output impedance changing part 2, as shown in FIG. 9, the PMOS transistors 26, 27 and 28, and the NMOS transistors 29, 30 and 31 are arranged in parallel. Regarding the size of each transistor, it is acceptable either all the sizes being equal or all the sizes being different.

Figure 10:
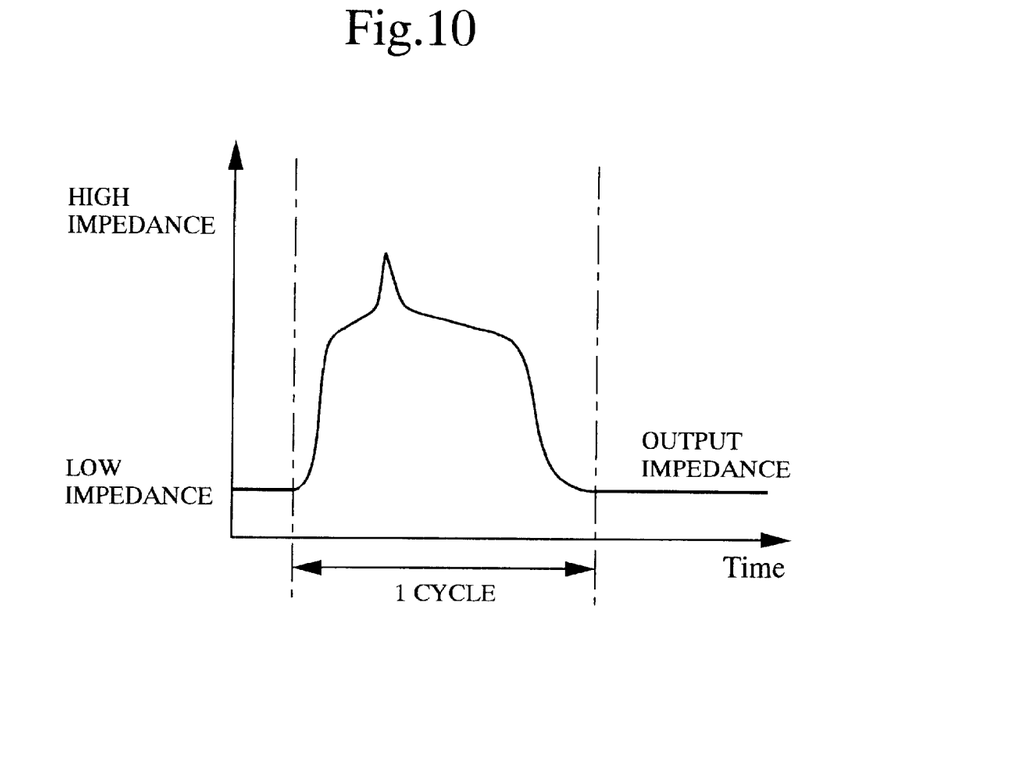
FIG. 10 shows a complicated output impedance characteristic according to Embodiment 7.

By separately controlling the PMOS transistor and NMOS transistor combination circuit, the output impedance can be minutely controlled. For instance, if it is necessary to perform a complicated control as shown in FIG. 10 by using the output impedance changing part of FIG. 6, a complicated control signal waveform has to be generated and controlled, because the output impedance changing part of FIG. 6 applies only one combination of the PMOS transistor and NMOS transistor. On the other hand, in the output impedance changing part according to the present embodiment, each transistor is separately controlled by a simple control signal at intervals. Consequently, the complicated control as shown in FIG. 10 can be realized as a synthesis output impedance by using plural transistors. Therefore, means for generating a complicated control signal waveform is unnecessary.

Besides, in the case of rapidly changing the output impedance from high to low (or low to high) under the condition of only one large-sized transistor, the response rate would become slow and desired characteristics would be difficult to obtain. On the other hand, when plural small-sized transistors are connected in parallel, the response rate can be fast and the desired characteristics can be easy to obtain.

Embodiment 8

Figure 11:
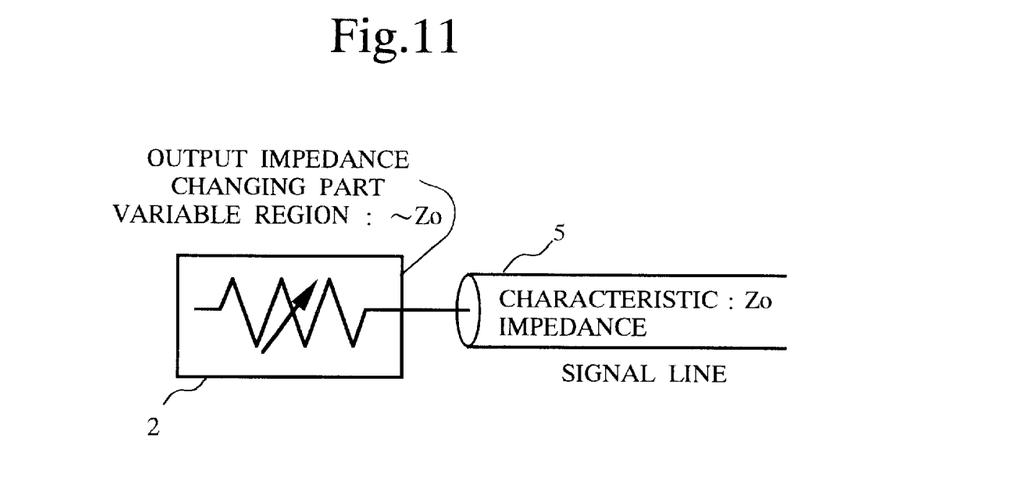
FIG. 11 illustrates the output impedance changing part and a signal line according to Embodiment 8.

In the present embodiment, the case of defining the upper limit of variable region of the output impedance changing part 2 to be characteristic impedance $Z_0$ of the signal line 5 will be described.

Figure 12:
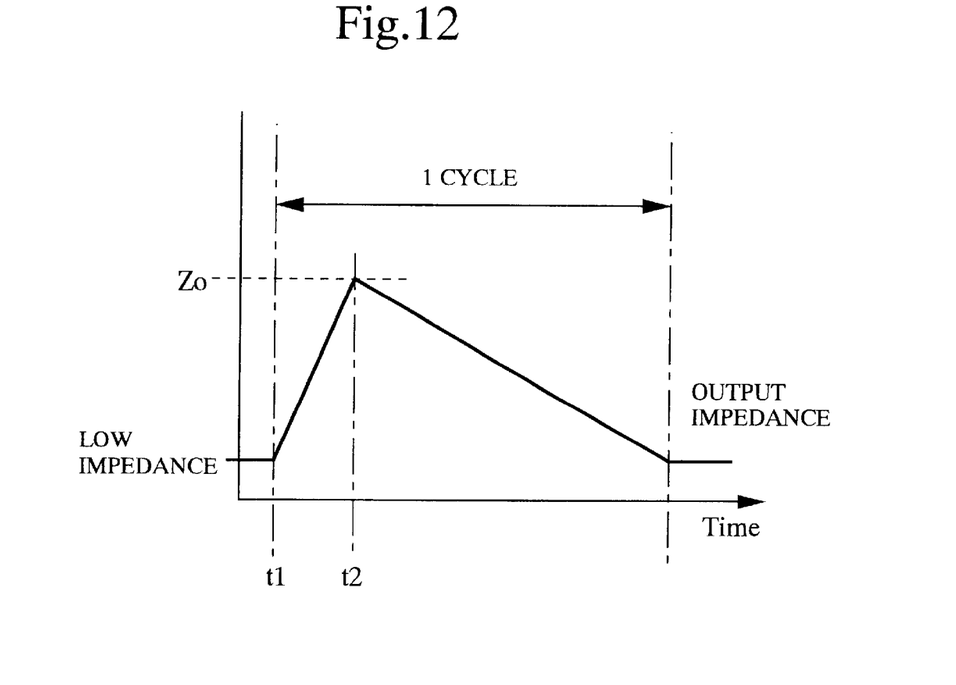
FIG. 12 shows a waveform indicating an impedance value after controlling the output impedance changing part according to Embodiment 8.
Figure 13:
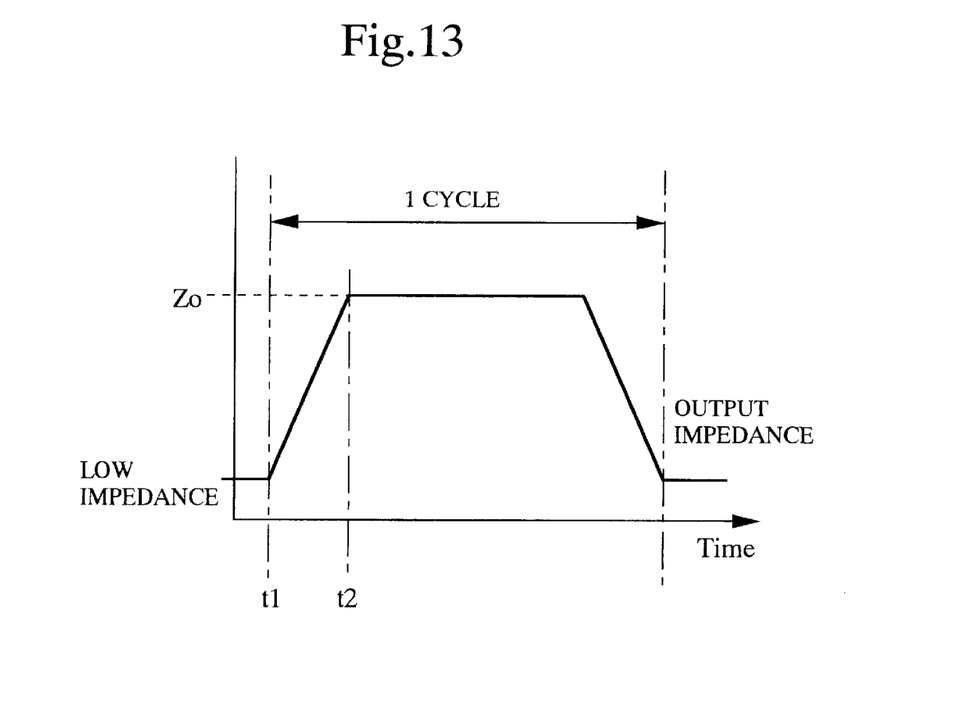
FIG. 13 shows another waveform indicating an impedance value after controlling the output impedance changing part according to Embodiment 8.

FIG. 11 illustrates the output impedance changing part 2 and the signal line 5 according to Embodiment 8, and FIGS. 12 and 13 show waveforms indicating impedance values after controlling the output impedance changing part 2 according to Embodiment 8.

The upper limit of variable region is defined to be $Z_0$ by way of adjusting a voltage applied to the gate, with utilizing the ON resistance between the source and the drain of the transistor in FIG. 6.

FIG. 12 shows the case that the output impedance becomes $Z_0$ at the time t2. When signals are continuously output from the specific output buffer to the bus during some cycles, it is necessary to return the output impedance to low by the time of the beginning of the next cycle output. If the output impedance is returned to low immediately at the time t2, not returned gradually, a regular signal transmission is prevented, because a reflection wave generated by an impedance mismatch in the bus is largely reflected again at the connection point of the bus and the output buffer. Accordingly, the reflection generates a large distortion in the signal waveform to prevent the regular signal transmission. On the other hand, if the output impedance is gradually returned to low as shown in FIG. 12, generating a large reflection wave can be prevented and so a large waveform distortion can be avoided. This is because the output impedance still close to the bus impedance $Z_0$ at the time of the reflection wave from the bus returning to the connection point of the bus and the output buffer. Besides, the signal on the triangle waveform of FIG. 12 can be generated by using a simple circuit as shown in FIG. 7 or 8, which makes realizing the present embodiment easy and inexpensive.

FIG. 13 shows the case that the output impedance continuously keeps $Z_0$ since the time t2. Even if a reflection wave is generated by a load, such as a transmission line or a device connected to the signal line 5 and the reflection wave is returned, the signal re-reflection can be prevented and the signal waveform distortion can be further suppressed as long as the output impedance changing part 2 is controlled in order to keep the waveform as shown in FIG. 13. The reason is that matching with the signal line 5 is kept at the output impedance changing part 2 which is the signal transmission termination, even when the reflection wave is returned.

Embodiment 9

Figure 14:
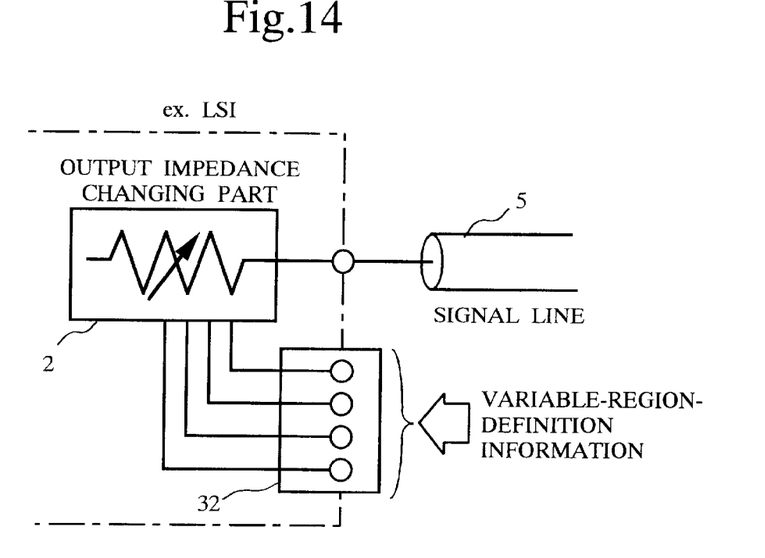
FIG. 14 shows a configuration for defining a variable region of the output impedance changing part according to Embodiment 9.

Defining the variable region of the output impedance changing part will now be explained in the present embodiment. FIG. 14 shows the configuration for defining the variable region of the output impedance changing part according to Embodiment 9.

A variable-region-definition inputting part 32 for controlling the variable region of the output impedance changing part 2 is shown in FIG. 14. Due to the variable-region-definition inputting part, it is possible to perform a pin-programmable defining the variable region from the outside of LSI, for example, on which the circuit according to one embodiment of the present invention is loaded. The variable region of the output impedance changing part 2 is controlled by inputting variable-region-definition information to the variable-region-definition inputting part 32.

It is an object of the present embodiment to easily perform an adjustment by inputting and defining an output impedance variable region from the outside.

It is also acceptable to compose the variable-region-definition inputting part 32 in order to define the variable region by automatically detecting the output load at the time such as beginning of Power On and setting the variable region based on the detection result.

Embodiment 10

Figure 15:
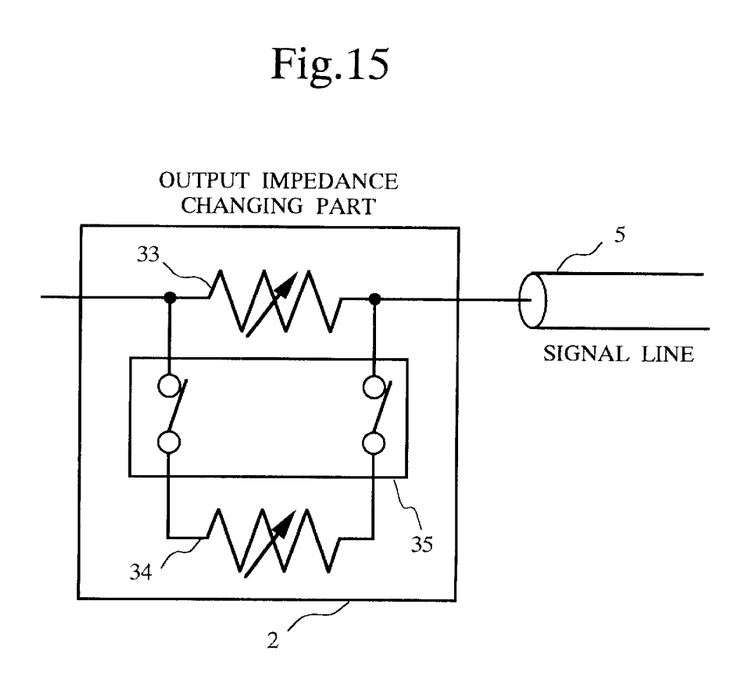
FIG. 15 shows a configuration of the output impedance changing part according to Embodiment 10.

The case that the upper limit of the output impedance variable region is switched by using a SW (switch) will now be described in the present embodiment. FIG. 15 shows the configuration of the output impedance changing part 2 according to Embodiment 10. A main output impedance changing part 33, an output impedance adjusting part 34, and an output impedance adjusting SW 35 for controlling the active/inactive of the output impedance adjusting part 34 are shown in FIG. 15.

Now the operation will be described. In the case of the bus configuration as shown in FIG. 19, when the No. 3 device 203 or No. 4 device 204 connected at the middle of the bus, not the end of it, outputs a signal, the load impedance goes down to around a half of the transmission line impedance. Then, the upper limit of the output impedance variable region of the device connected at the middle of the bus is adjusted to be equal to the load impedance. Concretely, the output impedance adjusting SW 35 is set to be active in order to connect the output impedance adjusting part 34 with the main output impedance changing part 33 in parallel. Owing to this, it is operated so that the upper limit of the output impedance may become low.

When a bus is driven at the middle, not the end of the bus, such as at the No. 3 device 203 or the No. 4 device 204 of FIG. 19, seemingly it is assumed that two transmission lines of the characteristic impedance $Z_0$ are running in parallel from the location, middle of the bus. Consequently, the characteristic impedance at the location goes down to $Z_0/2$. Therefore, the driver connected at this location has to drive a heavier load ($Z_0/2$) than the characteristic impedance $Z_0$ which is originally assumed. In this case, if it is desired to change a signal at the same rate as the case of the driver connected at the end of the bus, a drive ability larger than the case of the drive connected at the end of the bus is needed.

However, if the impedance of the: output impedance changing part 2 is increased to be $Z_0$ equivalent to the bus characteristic impedance at the time of output signal transition as described in the above Embodiment, it namely indicates that the drive current of the output buffer is restricted. Consequently, the signal transition rate is decreased and the high rate transmission is prevented.

Therefore, in the present Embodiment, the upper limit of the output impedance changing part 2 is restricted to be $Z_0/2$ in order to make the driver connected at the middle of the bus perform the most appropriate drive ability, to keep the same signal transition rate as the case of the driver connected at the bus end, and to realize the high rate transmission.

It is an object of the present embodiment to lower the upper limit of the output impedance and adjust a device connected at the middle of the bus to be corresponding with the load impedance, by switching an output impedance adjusting SW.

Embodiment 11

Figure 16:
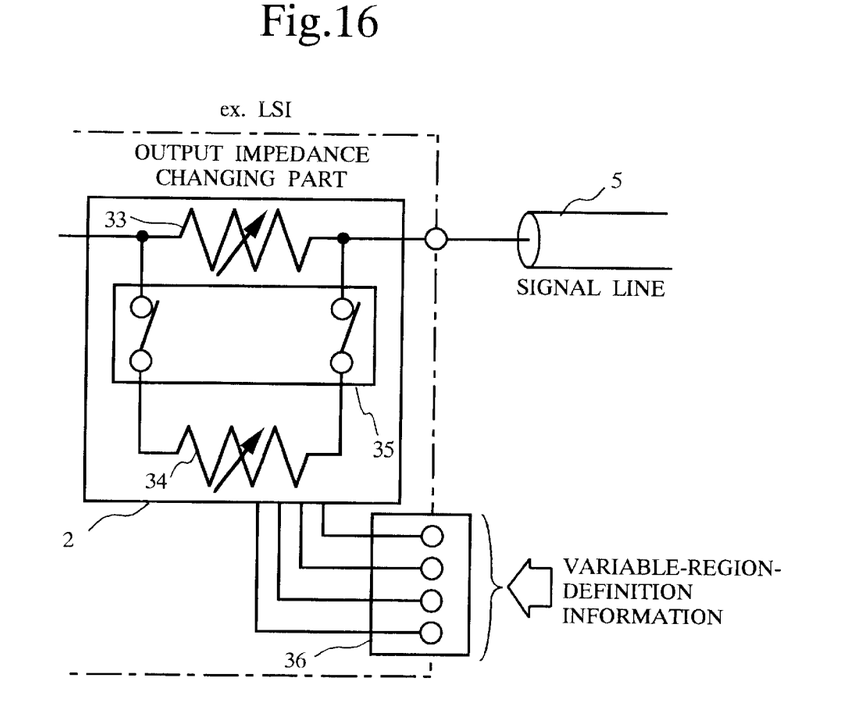
FIG. 16 shows a configuration of the output impedance changing part and a configuration for defining a variable region; of the output impedance changing part according to Embodiment 11.

FIG. 16 shows the configuration of the output impedance changing part 2 and the configuration for defining the variable region of the output impedance changing part 2 according to Embodiment 11. A variable-region-definition inputting part 36 for controlling the variable region of the output impedance changing part 2 is shown in FIG. 16. It is possible, for instance, to perform a pin-programmable defining the variable region from the outside of LSI on which the circuit according to one embodiment of the present invention is loaded.

Figure 21:
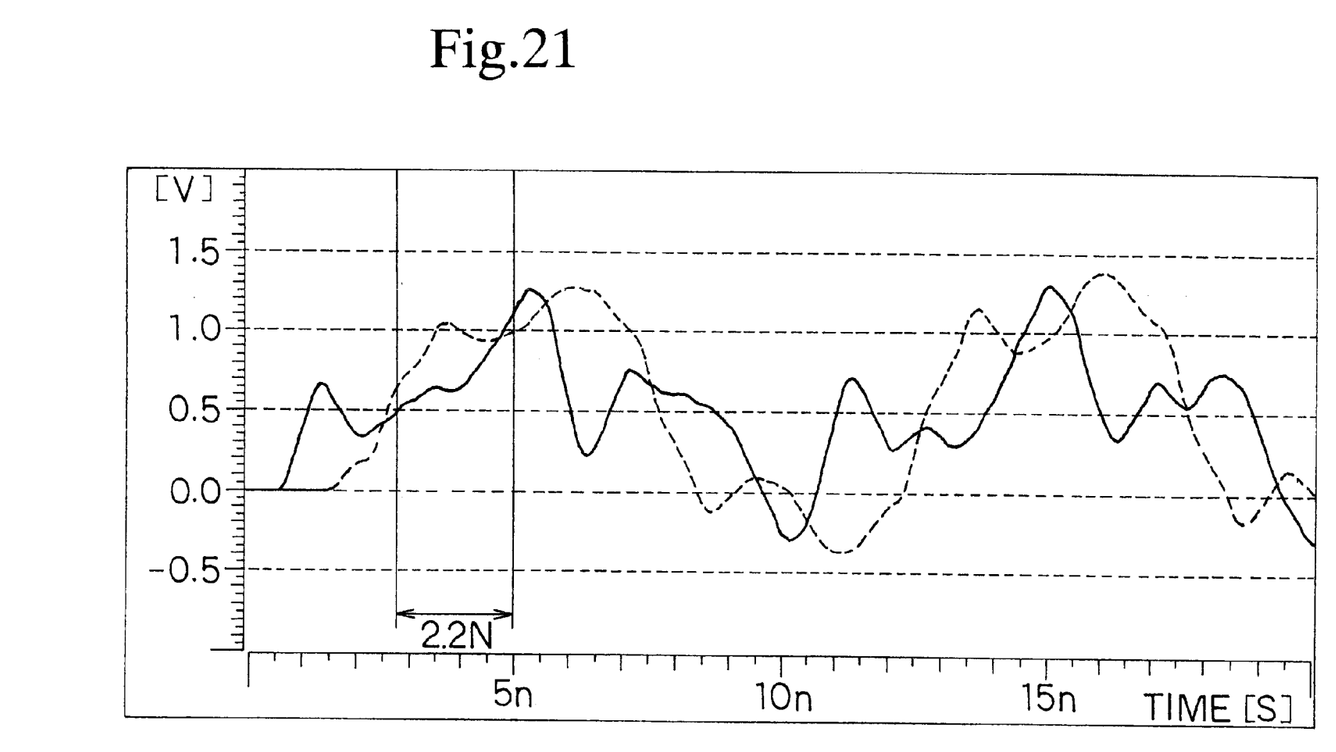
FIG. 21 shows a simulation result of the circuit according to the present invention, by simulating with the circuit simulator.

FIG. 21 shows a result of simulation, in the case of using the signal output system according to one embodiment of the present invention, performed under the same conditions as FIG. 18. Comparing with the method according to the conventional art as shown in FIG. 18, signals change faster and around 2 nsec is kept for using as the set up time in the present case, which is suited for high speed signaling. Regarding the circuit configuration of FIG. 19, the output signal 6 of FIG. 3 is used as the output signal from the No. 1 device 201 and the output impedance of the No. 1 device 201 is set to be the same state of the output impedance 7 of FIG. 3.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A digital signal output circuit for outputting an output signal to a signal line via an output buffer comprising:
    an output impedance changing part, connected between the output buffer and the signal line, for changing an output impedance;
    an output-signal-state-change detector for detecting a change of the output signal; and
    a continuous-change performing part for controlling the output impedance changing part, at a changing timing of the output signal, so as to continuously change the output impedance, when the output-signal-state-change detector detects the change of the output signal.

2. The digital signal output circuit of claim 1, wherein the continuous-change performing part controls the output impedance changing part, at the changing timing of the output signal, so as to continuously change the output impedance from low to high, when the output-signal-state-change detector detects the change of the output signal.

3. The digital signal output circuit of claim 2, wherein the continuous-change performing part controls the output impedance changing part, so as to continuously change the output impedance from low to high, at the changing timing of the output signal, and so as to return the output impedance to low after changing from low to high.

4. The digital signal output circuit of claim 1, wherein
    the digital signal output circuit inputs an output control signal into the output buffer,
    the output buffer outputs the output signal to the signal line when the output control signal is significant,
    the output-signal-state-change detector detects a next output signal to be output from the output buffer to the signal line at a next cycle, a present signal of the signal line in a present cycle, and the output control signal, and
    the continuous-change performing part controls the output impedance changing part, at the changing timing of the output signal, so as to continuously change the output impedance, when the output control signal is significant and a signal value of the next output signal differs from a signal value of the present signal.

5. The digital signal output circuit of claim 1, wherein the output impedance changing part includes a combination circuit composed of a PMOS transistor and an NMOS transistor, and
    the continuous-change performing part outputs a first output signal to the NMOS transistor and a second output signal, having an opposite phase to the first output signal, to the PMOS transistor.

6. The digital signal output circuit of claim 1, wherein the continuous-change performing part includes an integrating circuit having a resistor and a capacitor.

7. The digital signal output circuit of claim 6, wherein the integrating circuit further has an amplifier.

8. The digital signal output circuit of claim 1, wherein
    the output impedance changing part includes a plurality of combination circuits, each of which is composed of a PMOS transistor and an NMOS transistor, and
    the continuous-change performing part controls each of the plurality of combination circuits by outputting a first signal to the NMOS transistor and a second signal, having an opposite phase to the first signal, to the PMOS transistor, and respectively controlling each of the plurality of combination circuits.

9. The digital signal output circuit of claim 1, wherein the continuous-change performing part controls the output impedance changing part in order to adjust an upper limit of the output impedance to be an equal value to an impedance of the signal line.

10. The digital signal output circuit of claim 9, wherein the continuous-change performing part controls the output impedance changing part in order to maintain the upper limit of the output impedance.

11. The digital signal output circuit of claim 1, further comprising a variable-region-definition inputting part for receiving information on an output impedance variable region from an outside and defining the output impedance variable region,
    wherein the output impedance changing part changes the output impedance based on a defined output impedance variable region.

12. The digital signal output circuit of claim 1, further comprising:
    an output impedance adjusting part connected with the output impedance changing part in parallel; and
    an output impedance adjusting switch for switching a connection between the output impedance changing part and the output impedance adjusting part.

13. The digital signal output circuit of claim 1, wherein the continuous-change performing part controls the output impedance changing part to adjust an upper limit of the output impedance to be a half value of impedance of the signal line.

14. The digital signal output circuit of claim 1, further comprising:
    an output load detecting part for automatically detecting an output load; and
    a variable-region-definition inputting part for defining an output impedance variable region changed by the output impedance changing part based on a detected output load,
    wherein the output impedance changing part changes the output impedance based on a defined output impedance variable region.

* * * * *